June 7, 1960 R. A. FLORSHEIM 2,940,072
RADAR PLANNING DEVICE
Filed Sept. 10, 1945 3 Sheets-Sheet 1
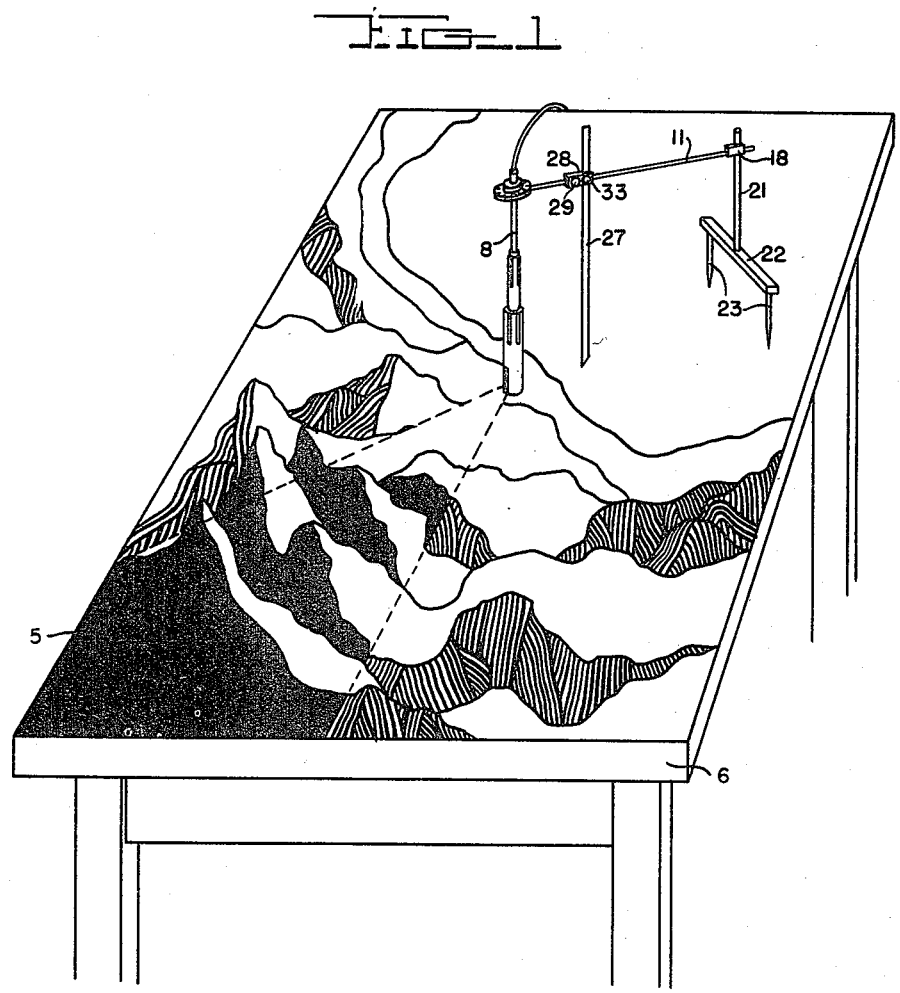
INVENTOR
RICHARD A. FLORSHEIM

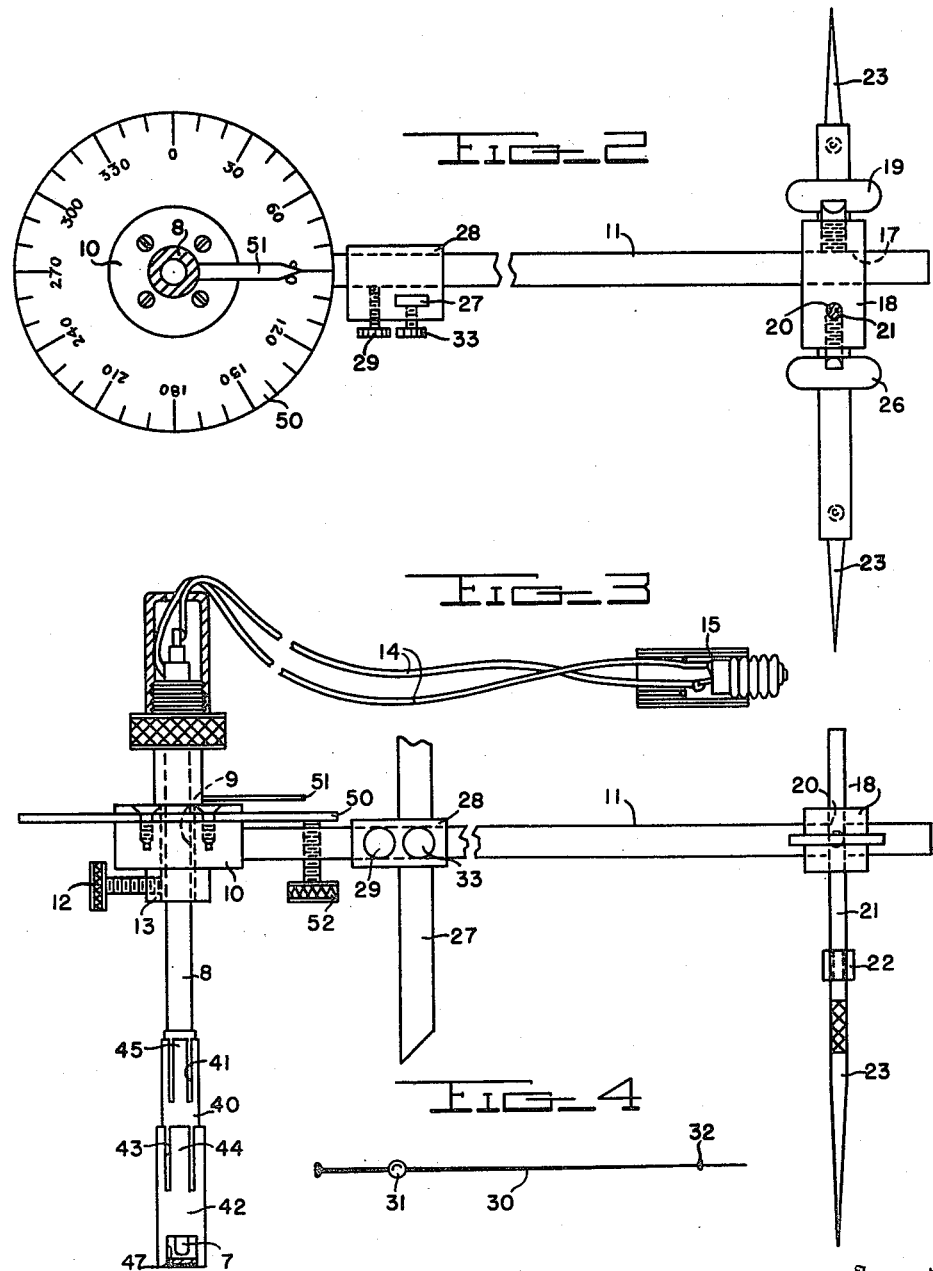

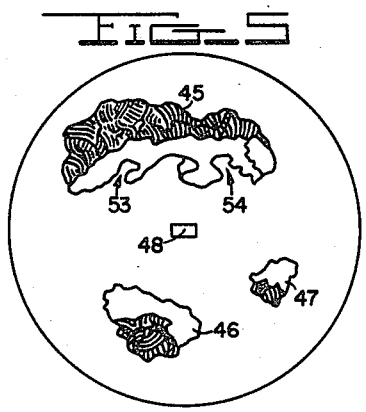
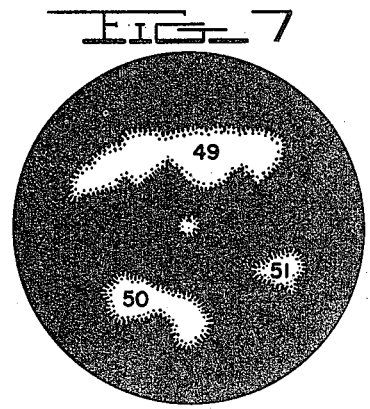

United States Patent Office 2,940,072
Patented June 7, 1960

2,940,072

RADAR PLANNING DEVICE

Richard A. Florsheim, United States Navy

Filed Sept. 10, 1945, Ser. No. 615,483

4 Claims. (Cl. 343—5)

(Granted under Title 35, U.S. Code (1952), sec. 266)

This invention relates to a method of and an apparatus for predetermining for a particular geographical area the effect of the terrain on wave propagation from a transmitter at a given location with respect thereto, and more particularly to a method of and an apparatus for predetermining for a particular geographical area the effect of the terrain on wave propagation from a radar apparatus at a given location with respect thereto.

Radar depends for its operation upon the fact that an object struck by a beam of high-frequency radiation will reflect a portion of that radiation to the point of origin of the beam. The reflected portion (echo) is detected by suitable equipment associated with the radar apparatus and is made to furnish the desired information with regard to the distance and the direction, relative to the radar apparatus, of the target from which echoes are reflected. At the ultra-high frequencies at which radar apparatus ordinarily is operated, transmission of energy, or radiation, is substantially entirely by means of rays or waves which travel directly and in a substantially straight line from the radar transmitter to the reflecting object. The operation may be likened to the use of a search light. In the case of a search light, the radiation in the form of visible light is emitted by the light source and is ejected into space as a light beam, or pencil of light, by the reflector and lens of the search light. If this beam of light strikes a target, such as an airplane, the target becomes visible to the observer, when the light ray strikes a target, two things occur: the light ray is reflected; and the light ray is prevented, presuming the object is opaque, from travelling further in its original direction. The reflected ray provides the visible image. The area beyond and behind the target, since it is not illuminated by the light ray, is not visible.

Similarly, the transmitted radar beam is projected into space by the radar antenna as a narrow beam of radiation whose shape is dependent upon the type of radar apparatus. At any position of the antenna, the beam illuminates a portion of the earth's surface extending from a point beneath the radar apparatus to the observer's visible horizon. When the radiated energy from the radar antenna strikes an object, reflection occurs, and, as in the case of light rays, areas beyond and behind the object are not illuminated. Consequently objects or targets lying beyond and behind the reflecting object normally cannot be detected by the radar.

With the foregoing considerations in mind, it will be apparent that the indications presented by the radar apparatus will be limited by obstructions lying in the path of wave propagation. This result may hamper the identification of the indication produced by the radar apparatus with the terrain or target causing the indication. Thus, a knowledge of the effect of the terrain of a given geographical area upon the wave propagation from a radar apparatus is very important to an accurate interpretation of the data presented by the radar apparatus.

An object of the present invention is to provide an effective and efficient method of and apparatus for siting, or locating a friendly radar in the most advantageous position for intercepting enemy craft.

Another object of the present invention is to provide an effective and efficient method of and apparatus whereby an analysis of enemy radar installations may be made with a view to enabling approach to enemy territory with a minimum chance of detection.

Another object of the present invention is to provide an effective and efficient method of and apparatus for familiarizing radio operators with the conformation of land to be encountered and the typical radar indication which will be produced thereby.

Another object of the present invention is to provide an effective and efficient method of navigation by radar whereby recognizable predictions of points along the prospective course are provided to enable orientation and navigation by radar.

Another object of the present invention is to provide an effective and efficient method of training operators in the use of radar equipment wherein the effects of terrain on wave propagation and radar coverage are visually presented.

In accordance with one embodiment of this invention, a device providing a point source of illumination is located on a relief map of an area at a point corresponding to the location of a radar apparatus in the actual area. By observation of the areas of the map which are illuminated and the areas of the map which are in shadow, it is possible to predict the effect of the area adjacent to the radar apparatus on wave propagation from the apparatus so located.

Other objects and advantages of the present invention will be apparent from the following detailed description taken in conjunction with the drawings, wherein:

Fig. 1 is a diagrammatic, perspective view of a relief map having a point source of illumination located thereon, the beam width being restricted to simulated radar beam width or a sector scan;

Fig. 2 is a plan view of the light source, partly in section;

Fig. 3 is a side elevation of the light source of Fig. 2;

Fig. 4 is a side elevation of an evasion-indicator pin used with this invention;

Fig. 5 is a diagrammatic plan view of a portion of an area having a radar apparatus located in the center thereof;

Fig. 6 is a view illustrative of a photograph made by illuminating a relief map corresponding to the area shown in Fig. 5 in accordance with this invention; and Fig. 7 is a view illustrative of the presentation obtained from a plan position indicator type of radar located at the point indicated in Fig. 5.

While the present invention is of particular value when used in conjunction with the plan position type of radar, since the data presented by employing this invention is directly comparable, without substantial modification, with the data provided by a plan position indicator type of radar, it is equally adaptable for use with any of the many types of radar. In order to facilitate an understanding of the operation of this invention, a brief description of the general types of radar will be presented.

In general, the more highly refined systems of radar data presentation utilize the electromagnetic cathode ray tube with a long persistence screen, while the simpler systems of data presentation use the electrostatic cathode ray tube in which the electron beam is made to follow some pattern by controlled differences in potential between pairs of deflecting plates. In the simplest type of presentation an electrostatic cathode ray tube with a linear sweep is employed and the linear sweep is applied to the horizontal deflecting plates to establish a time base, the video output of the receiver being applied to the vertical deflecting plates. Since the sweep is linear with time, a scale which is calibrated in range, may be placed on the oscilloscope screen. This scale permits reading of range directly and, since the antenna beam is highly directive, the maximum received echo appears when the antenna is pointing directly at the target. Thus by rotating the antenna until the echo pulse produces maximum deflection on the screen indication of range and of direction in azimuth or elevation can be obtained.

A more complicated type of presentation plots range against azimuth. In this type of presentation an electromagnetic tube is ordinarily employed. In the electromagnetic cathode ray tube, the position of the electron beam at any instant is determined by causing it to pass through a magnetic field produced by controlling the current applied to deflecting coils mounted outside the tube. If intensity modulation is used, the bias is such that the tube is held just beyond cutoff, and the video output of the receiver is applied to either the grid or cathode with such polarity as to release upon receipt of an echo signal the beam and allow the trace to appear on the screen. Thus the bright spots on the screen represent return echoes detected by the radar receiver. Thus if the sweep current flows through the vertical deflecting coils, and a positioning current controlled by the antenna position flows through the horizontal deflecting coils so that the position of the vertical sweep is aligned with the position in azimuth of the antenna, which may scan a region up to 90° on either side of dead ahead, range is plotted at right angles to direction. The return signals are used to intensity modulate the cathode ray beam to cause the target indication to appear as a bright spot on the screen.

In a third type of presentation, a map of the area being scanned is presented in polar coordinates with the antenna position occupying the center of the screen. This is referred to as the plan position indicator type of presentation. The indicator tube, which is generally of the electromagnetic type, is intensity modulated, with the sweep moving from the center radially outward. The sweep position is controlled by and synchronized with the antenna position throughout 360° of rotation. The top of the screen generally represents dead ahead, thus, if the antenna is pointing dead ahead, the sweep moves from the center of the screen to the top. Likewise, if the antenna points 90° to the right of dead ahead, the sweep moves from the center radially outward at an angle of 90° to the right of dead ahead. Thus a polar map is developed on which the range is plotted radially against the position in azimuth or bearing. In some cases a plan position presentation is employed using a sector scan rather than the full 360°. A plan position indicator type of radar finds considerable application in equipment designed for search, harbor control, convoy keeping, ground controlled interception and navigation.

While other types of radar presentation are employed in particular cases, they are in most cases, modifications or combinations of the three general types described. The applicability of the present invention to the three general types will be apparent as the description thereof proceeds; however, it will be understood that the description of the present invention in connection with a particular type of radar presentation is illustrative only and is not to be construed as a limitation upon the scope of application and utility of this invention.

Referring now to the drawings, and particularly to Fig. 1 thereof, it will be seen that a relief map 5 is provided and is mounted on the upper surface of a suitable table 6. In order to be useful for the purposes of the present invention, the relief map must be an accurate terrain model, representing the sum total of all topographic information and forming an accurate miniature of the terrain to be investigated. In practice, relief maps or terrain models are constructed from various information sources including navigational charts, topographical maps, photo-reconnaissance, and other intelligence. Except for certain specialized uses where local detail is important, such as the topography of a city or a part of a city, little cultural, that is, man-made, detail is required on the relief map, and ordinarily no coloring is required whatever except black and white. The relief map must be constructed, however, of materials not subject to warping, distortion due to flexibility, or to shrinkage. It has been found that plaster of Paris provides a suitable material for the present purposes.

Since, as a practical matter, the source of illumination, which will be hereinafter described in detail and which corresponds to the radar antenna, ordinarily will be a filament of an electric lamp, because of the thickness of the glass envelope, it is ordinarily not feasible to locate the filament closer than approximately one-sixteenth of an inch from the surface of the map; consequently, a vertical scale for the map must be chosen such that the one-sixteenth of an inch separation will not represent an excessive antenna height in feed. It will be understood, however, that models which are to be used for airborne applications are not so limited with reference to vertical scales. The horizontal scale is limited only by the overall dimensions of the model; consequently, in some cases it may be desirable to exaggerate the vertical scale in order to obtain accuracy in model construction and shadow determination.

In order to illuminate the relief map with rays of light corresponding to the beam of the radar transmitter, a point source of light is, as hereinbefore stated, located on the relief map at a point corresponding to the location of the radar transmitter in the actual area. A suitable point source of light is illustrated in Figs. 1, 2, and 3 and comprises a small, single filament lamp 7 which is mounted in the lower end of a vertically adjustable, rotatable tube 8. The upper portion of the tube 8 is mounted in a vertically extending aperture 9 formed through a cylindrical block 10 and the tube is slidable therein. The block 10 is mounted, as shown in Figs. 2 and 3, at the left end of a horizontally disposed rod 11. After the position of the lamp 7 has been adjusted either by rotating the tube 8 or by moving the tube in a vertical direction, the tube is locked in position by a set screw 12 which is threaded into an annular shoulder 13 integrally formed on the lower side of the block 10, the forward end of the set screw being adjustable to bear against a side of the tube 8. A pair of connecting leads 14 are connected to the lamp 7 and may be connected through a terminal plug 15 to a suitable source of current, not shown.

In order to provide a sturdy tripod support for the light source described, the horizontal rod 11, which has its left end, as aforesaid, fixed to the block 10, extends to the right therefrom and its right end is slidably journalled in an aperture 17 formed in a block 18. The position of the block 18 is adjustable with respect to the rod 11 and the block is provided with a set screw 19, suitably threaded therein, whereby the block 18 may be locked to the rod 11 in any desired position. A second aperture 20 is formed through the block 18, spaced to one side of the aperture 17, and extends vertically at right angles to the aperture 17 to receive the upper portion of a vertically disposed rod 21, the rod 21 being slidable in the aperture 20 to permit vertical adjustment of the position of the block 18.

As shown in Fig. 1, a horizontally disposed crossbar 22 is rigidly attached to the lower end of the vertically disposed rod 21, the rod 21 being connected thereto at a point substantially in the middle thereof. A pair of pedestal rods 23 are mounted on the cross bar 22 and extend downwardly from opposite ends thereof, the lower ends of these rods 23 being pointed to provide a small area contact on the surface of the relief map.

After the positions of the horizontal rod 11 and the vertical rod 21 have been properly adjusted to locate and support the light source at a desired point on the map surface, the rod 11 may be locked to the block 18 by the set screw 19 while the vertically disposed rod 21 is locked to the block 18 by a second set screw 26 similarly threaded into the block 18 but engageable with a side of the rod 21.

In order to permit adjusting the vertical position of the light source with respect to the surface of the relief map to simulate a radar located in an aircraft or to simulate the position of a radar antenna located on a high tower, a vertically disposed rod 27 is provided and is carried by a suitably apertured block 28 slidably supported on the horizontally disposed rod 11. The lower end of the rod 27 is pointed to provide a minimum area contact and the rod is preferably made of a transparent material to avoid casting a shadow. The block 28 may be locked in position on the rod 11 by a suitable set screw 29 which is threaded in the block so that its forward end may be caused to bear on the rod 11. The rod 27 may be locked in the position required to elevate the light source 7 to simulate an airborne radar by a second set screw 33, which is also threaded into the block 28 and which is adjustable to cause its forward end to bear against a side of the rod 27. When the rod 27 is not in use, that is, when the light source is to be positioned as close as possible to the surface of the relief map, the rod 27 may be removed, or may be slid upward a suitable distance and locked in that position. It will be apparent that by employing a rod 27 of sufficient length a considerable range of antenna heights may be simulated.

The foregoing description of the light source and supporting structure represents substantially the basic equipment required. However, as may be seen from the drawings, certain additions may be made to this basic equipment to provide for special applications of the present invention. The several additions will be described in turn as these particular applications are described.

In the operation of this apparatus the light source is so located with respect to the relief map that the lamp filament corresponds in position insofar as possible to the point occupied by the radar antenna, the coverage of which is to be predicted. With the light source in the desired position with respect to the relief map and the light 7 turned on, the radar coverage of a particular site can be determined visually by remembering that areas in shadow, as illustrated in Fig. 1, represent either regions of no coverage by radar if the target is below the shadow limit, or regions of detection if the target, as in the case of an airplane, is above the shadow limit. It will be understood, that it is desirable that the room in which this apparatus is used be darkened to facilitate observation.

By using an evasion-indicator pin 30 shown in Fig. 4, the radar coverage can be plotted in three dimensions with the apparatus so far described. As shown in Fig. 4, the pin 30 is pointed at one end and has mounted thereon a bead 31 which is longitudinally slidable so that its position on the pin may be adjusted. In employing these pins, the pointed ends of the pins are forced into the surface of the relief map at all key points, the depth to which the pins are inserted being preferably limited by providing a raised portion 32 suitably spaced from the pointed end of each pin. The portion 32 may be in the shape, as shown, of a flange integrally formed with the pin, or may be a collar suitably attached thereto. With the lamp turned on, the position of the bead is adjusted until the lamp no longer illuminates the side of the bead facing the lamp. The position of the bead is then adjusted until only a part thereof is illuminated. Knowing the length of the pin, an estimate may then be readily made of the depth of the shadow.

The evasion-indicator pins may also be employed to indicate a region of ground clutter. Since, in a region of ground clutter, there is virtually no radar coverage at any altitude, those pins which are located on the relief map in areas illuminated by the light source may be provided with specially colored beads; or the beads may be pulled to the top of the pin to indicate that the adjacent region is a region of ground clutter.

In some cases it may be desirable to restrict the width of the light beam to correspond to the beam width of the radar transmitter or to the width of the sweep of a particular radar transmitter, as, for example, where a plan position indicator type of radar is being used to make a sector scan. A restricted beam is illustrated in Fig. 1. To provide for this, a sleeve 40 is rotatably mounted on the lower end of the tube 8, the upper end of the sleeve 40 being provided with longitudinally extending, radially spaced slots 41 and the portions 45 of the tube intermediate the slots being bent inwardly to provide a pressure engagement. A second sleeve 42 of a diameter slightly greater than the diameter of the sleeve 40 but substantially shorter, is mounted over the lower portion of the sleeve 40 and is rotatable relatively thereto, being similarly provided with longitudinally extending, radially spaced slots 43 in its upper end and the intermediate portions 44 being bent inwardly to provide a pressure engagement. The lower end of each of the tubes is provided with a longitudinally extending slot or recess 47 which extends into each tube a distance sufficient to permit rays of light from the lamp 7 to pass and which is made approximately 120 degrees in width. This width is not critical, however, and any desired width may be employed. By rotating the sleeve 42 relatively to the sleeve 40, the width of the aperture formed by the two slots 47 may be easily varied to provide a ray of light having a width corresponding to any desired radar beam width or sweep width. When not in use the two sleeves may be slid upwardly on the tube 8.

In order to facilitate the determination of the direction relative to a given point of the restricted beam provided by employing the sleeve 40 and 42 just described, a circular scale or dial 50 is supported on the block 10 and is peripherally calibrated as, for example, in degrees. A pointer needle 51 is mounted on the upper portion of the tube 8 and extends over the surface of the scale 50. The scale 50 may be made rotatably adjustable on the block 10 and in that event a set screw 52 is provided and is threaded transversely through the rod 11 to bear against the under side of the scale to lock it in position when suitably adjusted. Since both the sleeve 40 and the sleeve 42 are relatively rotatable with respect to the tube 8, it will be apparent that they may be so positioned on the tube 8 that the pointer 51 may be employed to indicate the axis of the beam which is projected on the relief map by the lamp 7.

Knowing the effect of the surrounding terrain on wave propagation, which is determined as hereinbefore described, it is possible to select the most desirable position in which to situate a radar transmitter for most advantageous coverage. The problem involved in siting is to choose a location for the radar transmitter which provides maximum radar coverage and is relatively free from ground clutter. Frequently choice of a site must be made in advance, sometimes when the enemy is still in possession of the territory, and the choice must be accurate enough so costly mistakes will not occur. In the past, siting has often been a hit-or-miss proposition depending upon many unknown factors. Scientific methods of determining radar coverage involved the drawing of profiles and then constructing coverage diagrams: applications of these methods involve laborious drawing for each site to be considered and introduce involved calculations thus limiting the number of locations that can be tested conveniently. While it is possible to determine the ideal location after a considerable length of time has been spent in drawing profiles and performing calculations, speed and facility are the most urgent requirements in the field. Once a terrain model has been procured for the area under consideration, any number of sites may be tested quickly with the present apparatus.

The ideal radar site is one in which the lower edge of the radar beam skims close to the ground without returning an echo from it; this eliminates ground clutter and still allows low flying airplanes to be picked up. In addition, the radar should be situated so areas of deep shadow, in which approaching airplanes could not be detected, are minimized. By applying the principles and methods previously described, and by moving the light source from one possible site to another it will become apparent, in a particular case, that some locations are superior to others with respect to the coverage afforded. By a process of elimination the possibilities are narrowed down to the most desirable areas, and then in making the final choice account is taken of special considerations involved such as the difficulty of transporting heavy radar equipment to inaccessible points.

As a corollary to the problem of siting and the solution thereof in accordance with the present invention, the problem of evading detection by radar may also be solved in large part by the use of the present invention. Evasion is essentially the problem of discovering in advance the extent of enemy radar coverage. By knowing where to dodge through shadows and over ground clutter attacking bombers and fighter planes can delay initial detection and thus minimize losses by fully exploiting any weakness in enemy radar coverage. Solution of the evasion problem involves an analysis of enemy radar coverage from a knowledge of the location of their radar transmitters. The procedure employed is similar to that employed in siting. However, in connection with this problem the evasion indicator pins 30, as illustrated in Fig. 4, are employed, as hereinbefore described. By subsequently moving the light source to the location of all known enemy transmitter locations, and at each location plotting the coverage with the pins 30, the enemy coverage for any area can be readily determined, and the most desirable attack course then determined.

Evasion includes other methods for the avoidance of detection by enemy radar in addition to that of exploiting weaknesses. Among the more important of these is the electronic countermeasure known as "jamming," which is achieved by setting up a confusing array of electronic signals which disguise the presence of attacking airplanes and ships by confusing enemy radar operators. In jamming it is important to know that a jamming transmitter is so situated that its signals will be received by the enemy radar. In this case the determining factor is the terrain. The ability to determine whether a transmitter is situated so that the terrain does not interfere with transmission of signals to the enemy radar is therefore of paramount importance. It will be apparent that with knowledge of the position of an enemy radar, in accordance with this invention, it is then necessary only to locate the light source at a point at which the enemy radar position will be illuminated by the light source thus indicating that a beam from a jamming transmitter located at a point on the terrain corresponding to the point at which the light source is located on the relief map of the area will reach the enemy radar.

While radar apparatus as at present developed provides a satisfactory indication of position for an experienced operator who is familiar with the conformation of land to be encountered and the typical radar presentation which will be produced thereby, where the operator is inexperienced, and/or unfamiliar with the conformation of the land and the typical indication produced by the radar, efficient use of the radar apparatus is distinctly limited. In accordance with the present invention, however, the operator may be accurately informed in advance as to the typical radar indication which will be produced by a given terrain. In an individual case, the operator may be actually shown a relief map of the area illuminated by a point source of illumination, as hereinbefore described. However a more practical method for informing large groups is to photograph a relief map having a point source of illumination located thereon at a point corresponding to the location of a radar. In photographing a relief map illuminated in this way, of course, the photograph would be made in a room completely darkened except for the point source of illumination located on the relief map, and the camera would be located directly above the point source of illumination at a point sufficiently spaced therefrom to permit the camera to cover the entire area under consideration. By applying conventional photographic techniques, which are well known to the art, a photograph having a high degree of contrast may be produced in which the white areas will correspond to the areas illuminated by the light source and the black areas will correspond to the areas of no illumination. Desired corrections may be introduced into the photograph by opaquing, or etching, as may be required of the negative before making the final print.

A photograph so produced while it is otherwise an accurate representation of the indication which will be produced by a plan position indicator type of radar located at a point corresponding to the location of the light source, does not take into account the factor of radar beam width. In some types of radar apparatus, and particularly in radar apparatus operating on the longer wave lengths, the beam width may be as great as 30°, thus substantially affecting the clarity of delineation in the radar presentation. In order to provide a photograph which will take into account the factor of beam width, a photographic easel is employed, which is described in detail in my copending application Serial No. 615,484, filed September 10, 1945, now Patent No. 2,490,794 and which comprises a rotatable plate on which is positioned the film or paper to be exposed in a projection printing operation, and which during the printing operation is mounted so that the axis of rotation corresponds in position to the center of the projected image. Limits or stops are provided to restrict the rotation to the amount required to simulate a given beam width and during the projection operation the easel is oscillated about its axis within these limits, thereby producing an image which is, in effect, blurred, and thus corresponds to the image produced by a plan position type indicator radar having the same beam width. During the same operation a compass rose may be superimposed on the photosensitive material so that the degrees of the compass will be printed about the periphery of the photograph. Thus a photograph may be produced which will substantially correspond to the image produced by a plan position type of radar.

In order to illustrate the operation and utility of the present invention when employed in conjunction with the photographic procedure outlined, a plan view, similar to a birdseye view of a portion of an area which may be scanned by a radar apparatus is shown in Fig. 5. In this figure, it will be seen that there are three islands 45, 46 and 47, various points of which are of differing heights above sea level. If a radar apparatus be located at the point designated 48, which is substantially in the center of the area, and the radar is of the type which produces a plan position indication, that is to say it scans 360° in azimuth and the echoes are presented on a radar screen having a radial sweep which moves in a circular path and is synchronized in movement with the operation of the radar antenna to provide a circular map of the area, as hereinbefore described, the typical radar presentation which will be provided is indicated in Fig. 7. In Fig. 7, the white areas, designated 49, 50 and 51, correspond respectively to the islands 45, 46 and 47 shown in Fig. 5. While the general conformation of the portions of the islands which may be seen from point 48 are fairly well delineated in Fig. 7, with the exception of the inner portion of the inlets 53 and 54 of the island 45, it will be noted that the white areas are substantially smaller in depth and that the exact outlines of the areas 49, 50 and 51 are not clearly delineated. As hereinbefore explained, obstructions, such as hills or mountains, lying in the path of the radar beam will prevent detection of objects lying beyond the obstructions, and at the same time the beam width of the radar makes exact delineation of even the areas illuminated impossible. Because of these differences, in practice, recognition of the areas shown in Fig. 5 from the indication or presentation shown in Fig. 7 is relatively difficult, and exact determination of the position of the radar with respect to the actual area is exceedingly difficult. However, by comparing with the radar presentation the photograph shown in Fig. 6 which may be made in accordance with the photographic technique hereinbefore described by locating a point source of illumination at the exact point on a relief map corresponding to the location of the radar in the area of Fig. 5, that is point 48, identification of the radar presentation with the photograph and thus with the area being scanned is greatly facilitated. It will be noted that the edges are clearly delineated in Fig. 6 and thus by comparison of the photograph with the radar presentation an accurate interpretation of the radar presentation may be had. The factor of beam width may be added to the photograph. Since the relative position of the light source at the time of making the photograph is accurately known, when the radar presentation substantially corresponds to the photograph, the radar operator then knows that the radar antenna is in substantially the same relative position.

In navigating by radar, and particularly in bombing by radar, identification of a particular part of the presentation produced by the radar apparatus with a particular part of the terrain or target causing the indication is of great importance in ascertaining the exact position of the radar with respect to the terrain. In landfall and navigation, the important problem is to enable the radar operator to recognize the land forms and points of reference in the distorted images produced on the radar scope. Radar has been used for navigation by orienting scope signals with respect to a map or chart. However, a study of charts of topographical areas is not always satisfactory since land forms produce different patterns on the radar scope when approached from different directions in addition to the distortions inherent in the radar apparatus. If the operator is unable to correlate the radar signals with navigational charts, the effectiveness of the radar as a navigational aid is seriously reduced. As previously indicated, however, it is possible to provide any number of simulations in accordance with the present invention for various locations on or over a terrain model. Simulations may be prepared for an individual location or for a definite course, just as these may be also used to check points in navigation, aiding in the task of interpreting the scope images enroute and in identifying signals for guidance. By preparing a series of photographs taken by locating the point source of illumination at a number of points along the course to be taken, these points corresponding to navigational check points, and then comparing the photographs with the changing radar presentation as the craft in which the radar is located proceeds on its course, the precise location of the craft with respect to the area may be determined at any desired number of points. By providing one photograph made by locating the point source of illumination on the relief map at the exact point at which bombs are to be released, it is then necessary only for the navigator to guide the craft to a point at which the image of the photograph in order to locate the craft exactly at the same position at which the point source of illumination was located when the photograph was made.

In accordance with the present invention, a device may be employed whereby the virtual image of the photograph is projected and superimposed on the image of the radar indicator to facilitate alignment and/or comparison. Then when the radar indication is aligned with the projected photographic image, the operator knows that the craft is in a position corresponding exactly to the position of the light source at the time the photograph was made. Any difference in alignment may, of course, also be employed as an indication of the relative position of the craft with respect to the area. It is also possible to photograph the simulations on strip film for projection to enable an entire flight plan to be briefed or to make a motion picture of the relief map while moving the light source along the desired course. By superimposing the motion picture image on the radar scope a continuous check may be had on position.

From the foregoing description, it will be apparent that by employing an apparatus such as that hereinbefore described in accordance with the various methods of the present invention, it is possible to predetermine accurately for a given geographical area the effect of the terrain on wave propagation from transmitter at a given location with respect to the area, and by employing the photographic technique described, photographs may be made whereby, in conjunction with a radar apparatus, navigation may be considerably facilitated.

While this invention has been described in conjunction particularly with a plan position type of indicator, it is feasible to convert a photograph made as herein described to simulate the type of presentation produced by radars employing indicators having a linear sweep instead of the radial type sweep.

While but several embodiments of this invention have been described, it will be understood that many changes and modifications may be made therein without departing from the spirit or scope of the present invention, which is limited only by the appended claims.

The invention shown and described herein may be manufactured or used by or for the Government of the United States of America for governmental purposes without the payment of any royalties thereon or therefor.

What is claimed is:

1. A method of navigating a craft equipped with a radar having a plan type radar display comprising the steps of constructing a scale model topographical map of the area to be navigated, illuminating said map with a point source of light located successively at spaced intervals along the route to be traversed, photographing said map during each successive illumination, and successively superimposing said photographs on said radar display as said craft proceeds along its course to provide a series of navigational check points.

2. A method of navigating a craft by radar comprising the steps of constructing a series of topographical maps of the area to be navigated, illuminating said maps with a point source of light located at spaced intervals along the route to be traversed, photographing said maps when so illuminated and successively comparing said photographs with the radar display on said craft as the craft proceeds along its course to provide a series of navigational check points.

3. A method of navigating a craft equipped with a radar having a plan type display comprising the steps of constructing scale model topographical maps of the area to be navigated, illuminating said maps with a point source of light located successively at spaced intervals along the route to be traversed, photographing said maps during each illumination, and successively superimposing said photographs on said radar display as said craft proceeds along its course to provide a series of navigational check points.

4. A method of navigating a craft equipped with a radar having a plan type display comprising the steps of constructing scale model topographical maps of the area to be navigated, illuminating each said map with a point source of light located at a selected point along the route to be traversed, photographing each said map from directly above said source location, projecting an image of each photograph on a photosensitive material, and oscillating said material about the axis of projection, the degree of oscillation corresponding to the beam width of said radar, said representations on said photosensitive material being used to identify said selected points along the route as they are displayed by said plan type radar display.

References Cited in the file of this patent

UNITED STATES PATENTS

| | | |
|---|---|---|
| 646,582 | Murche | Apr. 3, 1900 |
| 742,870 | Hill | Nov. 3, 1903 |
| 1,278,632 | Gerashshenevsky | Sept. 10, 1918 |
| 2,183,634 | Zworykin | Dec. 19, 1939 |
| 2,279,151 | Wallace | Apr. 7, 1942 |
| 2,374,981 | Cooke | May 1, 1945 |
| 2,405,591 | Mason | Aug. 13, 1946 |
| 2,406,751 | Emerson | Sept. 3, 1946 |
| 2,428,427 | Longhren | Oct. 7, 1947 |
| 2,443,631 | McDermott et al. | June 22, 1948 |
| 2,508,562 | Bonner | May 23, 1950 |
| 2,512,086 | Bowen et al. | June 20, 1956 |

OTHER REFERENCES

"Topography and Surveying" (Special Methods of Relief Representation), published by the War Department, January 3, 1928, Training Manual, No. 2180-35, copy on file in Division 47, Class 35, subclass 41, pages 11-13, 15, 21 and 22.